No. 822,726. PATENTED JUNE 5, 1906.
J. F. DURYEA.
FRICTION CLUTCH.
APPLICATION FILED DEC. 12, 1904.
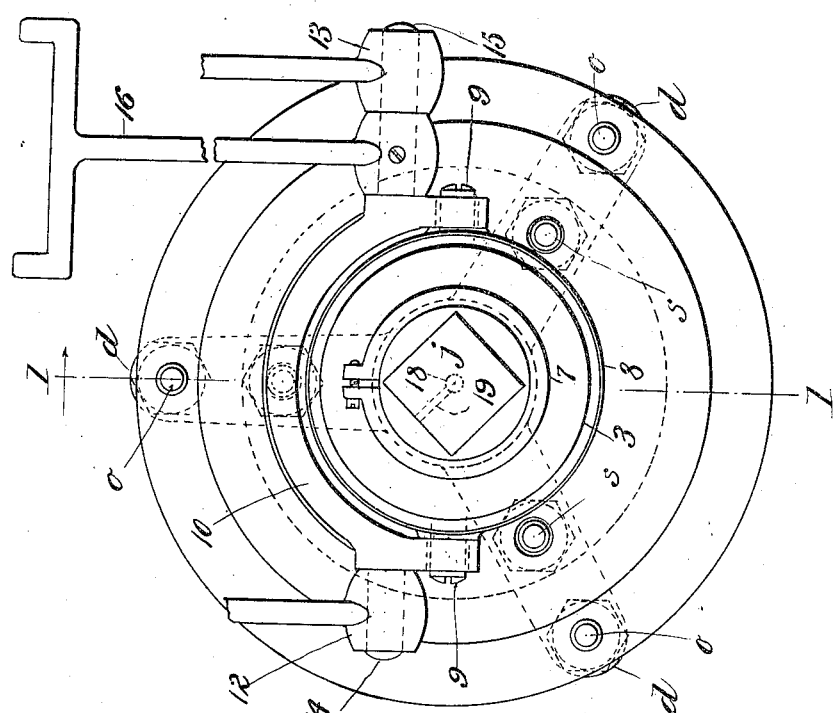
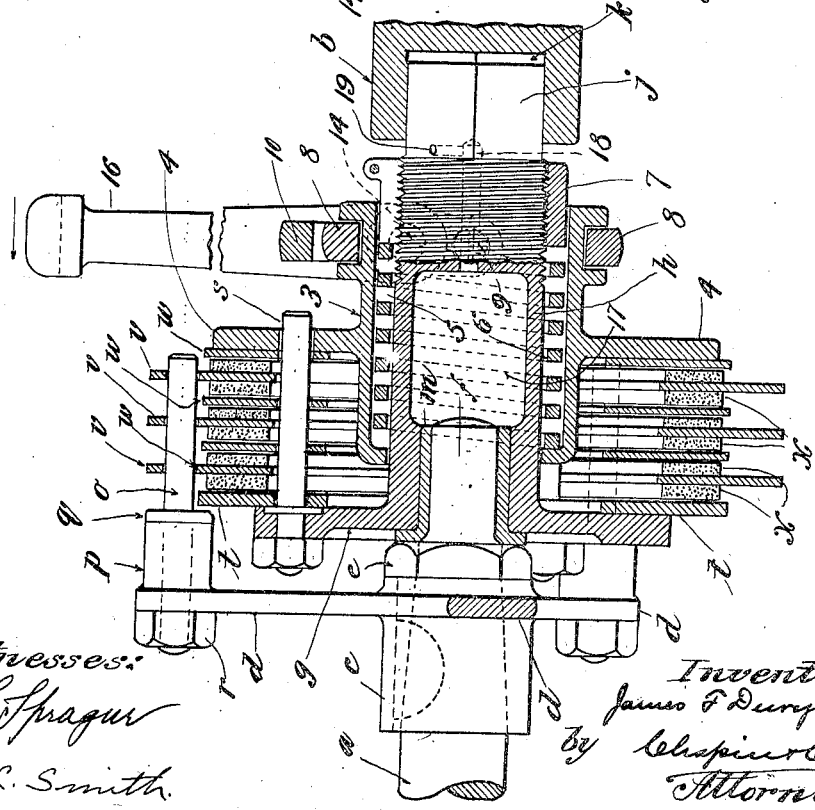
Witnesses:
H. L. Sprague
E. L. Smith
Inventor
James F. Duryea
by Chapin & Co
Attorneys.

UNITED STATES PATENT OFFICE.

JAMES FRANK DURYEA, OF SPRINGFIELD, MASSACHUSETTS.

FRICTION-CLUTCH.

No. 822,726.     Specification of Letters Patent.     Patented June 5, 1906.

Application filed December 12, 1904. Serial No. 236,501.

*To all whom it may concern:*

Be it known that I, JAMES FRANK DUR-YEA, a citizen of the United States of America, residing at Springfield, in the county of Hampden and State of Massachusetts, have invented new and useful Improvements in Friction-Clutches, of which the following is a specification.

This invention relates to friction-clutches, and has special reference to clutches of that type which comprise a series of concentrically-disposed rings on the driving and the driven members of the clutch, the peripheries of which overlap and which are pressed together to provide the requisite frictional contact, the object of the invention being to provide an improved clutch embodying this principle of construction whereby the clutch may occupy as small a space as is consistent with the work it has to perform.

A further object of the invention is to so construct the clutch that it may be easily and quickly taken apart and whereby an easily-accessible adjusting device may be provided for the clutch-operating spring, the construction being so arranged that the adjustment of one member only is required to increase or diminish the frictional contact between the contact parts.

Having these ends in view, the invention consists in the construction described in the following specification and carefully summarized in the claims, said construction being illustrated in the drawings accompanying this application, in which—

Figure 1 is a longitudinal sectional view of a clutch embodying this invention. Fig. 2 is an end elevation of the same as viewed from the right-hand side of Fig. 1.

The clutch which forms the subject-matter of this application is designed especially for use on self-propelled vehicles, in which it is desirable and often necessary to utilize all of the machinery space to the greatest possible advantage, and this clutch has been designed with special reference to its use on these vehicles. In this connection it should be stated that there are two types of this kind of clutch, one of which is intended to be run dry and the other of which is designed to be run in oil, the clutch forming the subject-matter of this application being of that kind designed to run dry—that is, to have non-lubricated contact-surfaces.

In the drawings, $a$ indicates the end of the crank-shaft or some like driving-shaft of a motor, and $b$ the end of a driven shaft. On the end of the shaft $a$ is a frame consisting of the hub $c$, keyed on the shaft and having a number of radially-disposed arms $d$ extending therefrom, said hub and arms being preferably integral. In the drawings the construction is shown as embodying three of the arms $d$ set at equal distances apart on the hub, this number of arms having been found to provide the necessary rigidity; but their number may be increased, if desired, or a disk may be employed instead of the arms, though this adds unnecessary weight. Preferably in fixing the hub $c$ on the end of the crank-shaft $a$ the two parts are tapered and keyed, and after the hub has been so fitted to the shaft a nut $e$ is screwed onto the end of the latter against the hub to insure, as far as possible, an immovable connection between said hub and the shaft.

Beyond the nut $e$ the shaft $a$ is extended, as shown at $f$, to provide a bearing for the inner end of a second clutch-frame consisting of the arms $g$ and the long hub $h$, the outer end of which is squared off, as at $j$, to enter the squared socket $k$ in the end of the driven shaft $b$. Over the end $f$ of the shaft $a$ is fitted a bushing $m$, having a flanged head thereon, which may take the thrust of the hub $h$, which is partly supported on the contiguous ends of the driving and driven shafts.

The frame, consisting of the hub $c$ and the arms $d$, may be referred to for the sake of conciseness as a "driving" clutch-head and the frame comprising the hub $h$ and the arms $g$ as the "driven" clutch-head. At the extremities of the arms $d$, which are integral with the hub $c$, the pins $o$ are mounted one in the end of each arm to render them rigid, passing through bosses $p$ cast integral with the arms and are secured therein in any convenient manner; but preferably they are provided with flanges $q$ to bear against the end of the boss, and a nut $r$ is threaded onto the end of the pin which extends through the arm. It is understood that these pins are parallel with the axis of the crank-shaft and equidistant therefrom. In the ends of the arms $g$ of the driven clutch-head similar pins $s$ are mounted in the same way as the pins $o$ are secured in the arms $d$, space, however, not permitting the provision of as long a bearing for the end of the pin as in the arms $d$. These pins $s$ are likewise parallel with the axis of the shaft $a$. Over these pins $s$ there is fitted a base-ring or abutment-ring $t$, and alternately on the pins o and the pins s the friction-rings v and w are arranged, the rings v being on the pins o, the rings alternating, as shown in Fig. 1 of the drawings. These rings v and w are of sheet metal, having holes punched therein to fit their respective pins loosely, whereby they may move more or less on the latter endwise. This clutch being of the type intended to run dry, one set of these rings is provided on each side thereof with leather facings x. In this instance these facings have been shown as applied to the rings v.

Loosely mounted on the hub h is another hub 3, having an annular flange 4 cast thereon, the hub 3 being turned out on its interior surface to provide the annular recess 5, in which is located a stiff spiral spring 6, one end of which bears against the hub 3 at one end of said annular recess 5 and the other end of which bears against the end of a pinch-nut 7, which is screwed onto the threaded end of the nut h and extends into the recess 5, the outer surface of said nut constituting a bearing for the outer end of said hub 3. On the outer end of the hub 3 is a flange in which is turned an annular groove to receive the loose ring 8. This is provided with trunnions 9, to which the ends of a semicircular fork 10 are connected, which fork is arranged to swing in bearings 12 and 13, which are represented in the drawings merely in a conventional way, said fork being provided with trunnions 14 and 15, extending into these bearings, and on one of these, as on the trunnion 15, (see Fig. 2,) a lever 16 is secured, whereby the fork may be oscillated in its bearings and sliding movement thereby be communicated to the hub 3 through the ring 8, mounted as described in the annular groove in the end of the hub 3, and it is the function of said lever to compress the spring 6 to relieve the rings v and w from frictional contact with one another, and thus break the connection between the driving and driven shafts. If all pressure on the lever 16 is removed, the expansion of the spring 6 will move the hub 3 forward, and thus compress the rings v between the rings w, and the ring t and the arms g of the driven clutch-head taking all of the end thrust of said spring, the rings v being loose on their pins o.

The above-described construction sets forth clearly the means of connection between the driving and the driven shafts, and it is apparent that it is only necessary to separate the driven shaft from the squared end j of the hub h to permit the withdrawal of this hub and all of the parts supported thereon, thus making the dismounting of the clutch for purposes of repair and inspection a matter of easy accomplishment. The spring 6 is adjusted by the manipulation of the pinch-nut 7, so that the maximum effort of the clutch may be adjusted to be just equal to the load it has to transmit from the shaft a to the shaft b, and to effect this adjustment it is very desirable, especially when the clutch forms part of the mechanism of a self-propelled vehicle, that this adjustment should be easily made and that one adjustment alone should be required, and to this end the pinch-nut is so located that it may be readily manipulated to increase or decrease the tension of the spring 6. With the clutch thus adjusted to the load it is immaterial how quickly the clutch be thrown onto its full power, even with the shaft a running at its maximum speed, for as the clutch is only equal to the torque of said shaft when the latter has picked up its load it will of course slip when the load exceeds this point, picking up its load gradually as the momentum of the shaft a is overcome, and the driven shaft will thus start without a jump, even though the clutch is thrown in suddenly.

By practically nesting the driving clutch-head and the driven clutch-head great economy of space results, not only because of the compactness of the mechanism itself on account of this nested disposition of the parts, but because of the fact that it requires only the separation of the squared end j of the hub h from the socket in the end of the driven shaft b to separate the driven and the driving clutch-heads. The hub h is cored out to provide a cavity 17 therein, which not only serves to lighten the structure, but also constitutes an oil-chamber to lubricate the bearing of the hub h on the bushing m and of the latter on the extension f of the shaft a. Oil may be introduced into this cavity through an axially-located hole 18, (shown in dotted lines in the drawings,) which is intercepted by another hole 19, extending through the squared side of the hub h. If this clutch mechanism were located in the tubular base of an engine, then the bearings 12 and 13 would be formed in the opposite walls of said base. Any suitable device may be provided to lock the lever 16 in a position which will hold the driving and driven clutch-heads out of operative contact one with the other. No such means, however, have been shown in the drawings, nor need any be shown, for a notched plate or some similar device may be used for this purpose.

Having thus described my invention, what I claim, and desire to secure by Letters Patent of the United States, is—

1. The combination with a driving and a driven shaft, of a friction-clutch mechanism consisting of a frame secured on the driving-shaft, and a second frame comprising a long hub having a bearing on the driving-shaft and a driving connection with the driven shaft; pins on said frames parallel with the axis of the shaft and extending in the same direction; said second frame being nested within the area circumscribed by the pins of the other; friction-rings supported loosely on the pins of each frame those on the one alternating with and overlapping those on the other; a sliding hub mounted on the hub of said second frame, a flange on said sliding hub through which the pins on said second frame extend, a spring to actuate the sliding hub to move the flange thereon against the friction-rings, there being an abutment on said second hub for said rings; an adjusting device on the hub of the second frame constituting an adjustable abutment for said spring, and a lever connected with said sliding hub to move the latter away from said rings.

2. The combination with a driving and a driven shaft, of a driven clutch-head comprising a long hub having a bearing at one end thereof on the driving-shaft, and having a connection at the opposite end thereof with the driven shaft, a flange or arms on said hub at right angles thereto, pins supported in said flange or arms in parallelism with the axis of the hub, friction-rings fitted loosely on said pins, said flange or arms constituting an abutment for the rings; a sliding hub provided with a flange or arms through which said pins pass loosely, a spring to move said sliding hub to effect the compression of the rings between the flange or arms thereon and the flange or arms on said hub; a driving clutch-head secured on the driving-shaft and comprising a flange or arms, and pins fixed therein in parallelism with the axis of said hub and extending in the same direction as the pins on the latter, friction-rings loosely mounted on the pins of the driving clutch-head and alternately arranged in overlapping relation relative to the rings on the driven clutch-head; an adjusting device on the hub of the driven clutch-head constituting an abutment for said spring, and a lever operatively connected with the sliding hub to move the latter to compress said spring.

3. In a device of the class described, the combination of a driving-shaft and a driven shaft, a sleeve on said driven shaft and having arms integral therewith, a frame rigidly secured to the driving-shaft and carrying supporting-pins at the outer ends of the arms thereof, a second frame having a long hub loosely mounted on said sleeve carried by the driven shaft, said second frame having pins secured in the outer ends of the arms thereof, a hub 3 loosely mounted on the second frame and carrying an outwardly-extending flange having perforations therein, a series of friction-disks loosely mounted on the pins of the two sets of frames, a spring loosely mounted between the said hub 3 and said second frame, said spring normally exerting a tension so as to compress the said friction-disks to transmit motion from the driving to the driven shaft, and means including a pinch-nut for adjusting the tension of said spring, said pinch-nut being mounted on the said second frame, said second frame being formed with a hollow or cut-out portion adjacent the threaded end thereof on which the pinch-nut is located, and means comprising a foot-lever loosely mounted in stationary bearings for releasing the tension of said spring and allowing the disks to revolve freely one on the other.

JAMES FRANK DURYEA.

Witnesses:
K. I. CLEMONS,
WM. H. CHAPIN.